A. W. SIZER.
PRESS.
APPLICATION FILED SEPT. 17, 1918.

1,312,811.

Patented Aug. 12, 1919.
3 SHEETS—SHEET 2.

Inventor
Albert W. Sizer
by Herbert W. T. Jenner
Attorney

A. W. SIZER.
PRESS.
APPLICATION FILED SEPT. 17, 1918.

1,312,811.

Patented Aug. 12, 1919.
3 SHEETS—SHEET 3.

Inventor
Albert W. Sizer
by Herbert W. Jenner
Attorney.

UNITED STATES PATENT OFFICE.

ALBERT WILLIAM SIZER, OF HESSLE, NEAR KINGSTON-UPON-HULL, ENGLAND.

PRESS.

1,312,811.   Specification of Letters Patent.   Patented Aug. 12, 1919.

Application filed September 17, 1918. Serial No. 254,402.

*To all whom it may concern:*

Be it known that I, ALBERT WILLIAM SIZER, a subject of the King of Great Britain, residing at Hessle, near Kingston-upon Hull, in the county of York, England, have invented certain new and useful Improvements in Presses, of which the following is a specification.

This invention relates to that type of apparatus for expressing oil or liquid from seeds, nuts and other oil or liquid containing materials and substances and for compressing the residuum into solid form, wherein compression of the material and expression of the oil or liquid therefrom is effected by means of a worm screw.

The object of the present invention is to provide improvements in apparatus of the kind hereinbefore referred to for the purpose of insuring more satisfactory expression of oil or liquid from seeds, nuts and other oil or liquid-containing materials and substances and at the same time for effecting the compression of the residuum into solid form.

The invention will be best understood from a consideration of the following description, taken in connection with the accompanying drawings forming a part of this specification.

Figure 1:
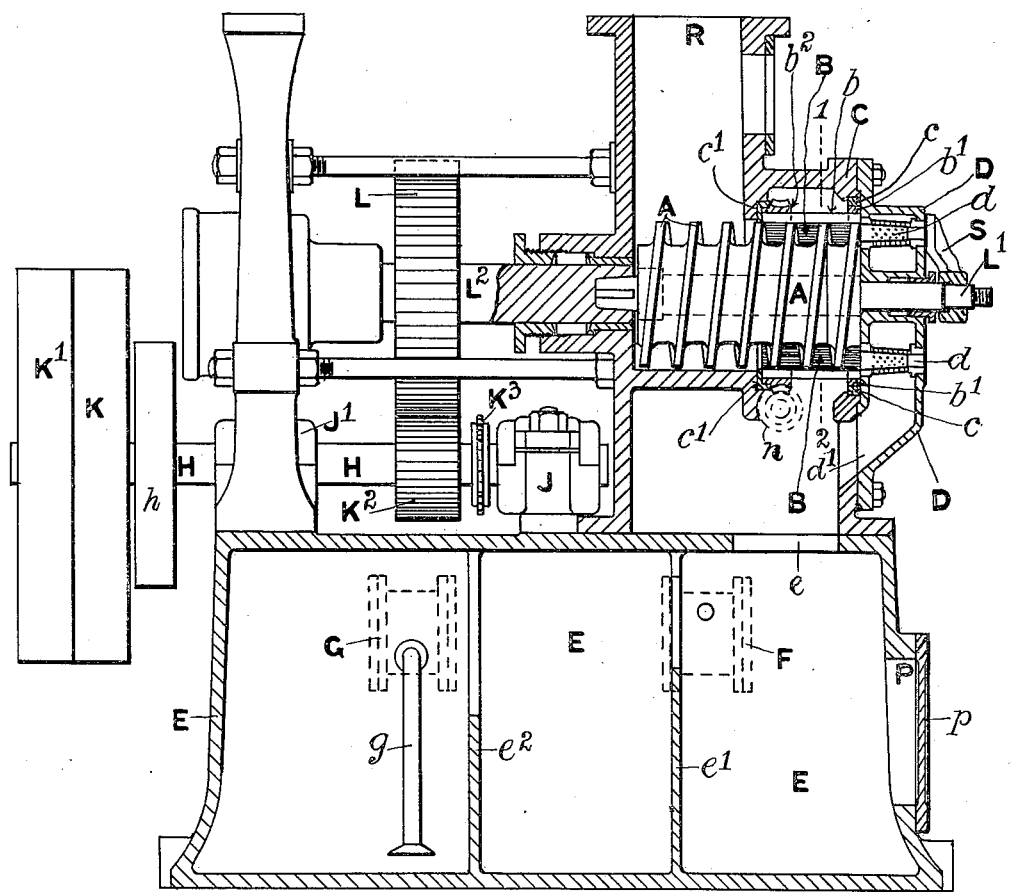
Figure 2:
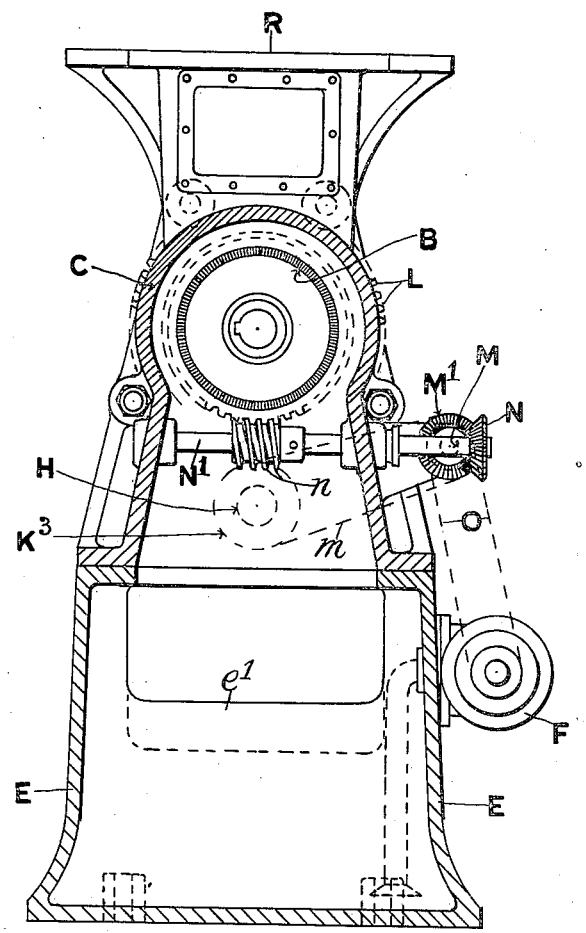
Figure 3:
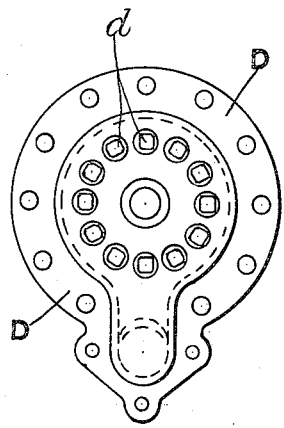
Figure 4:
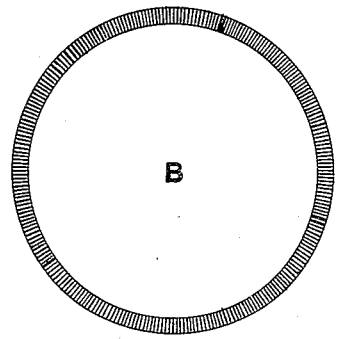

In the drawings: Figure 1 represents a longitudinal elevation, partly in section, of a machine or apparatus in accordance with my invention but with the kettle, hopper or like receptacle for holding the seed or other material to be fed to the machine or apparatus, omitted, Fig. 2 a view taken on the line 1—2 of Fig. 1 but with the compressing worm removed and Fig. 3 a front view of the die-plate. Fig. 4 is an end view of one form of the tube which incloses a portion of the compressing worm, Fig. 5 an inside view of one half of the tube illustrated at Fig. 4, Fig. 6 a perspective view of one of the plates or staves employed in the construction of the tube illustrated at Figs. 4 and 5, and Fig. 7 a front view of two of such plates or staves placed together to show how one form of the outlets for the expressed oil or liquid is produced.

Similar reference characters are employed to indicate like or corresponding parts in the several figures of the drawings.

Figure 5:
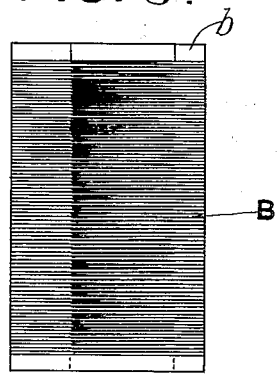
Figure 7:
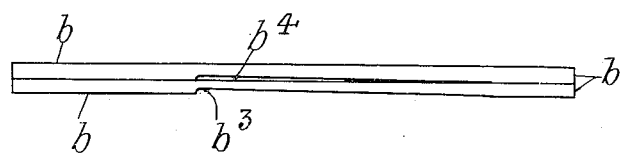

According to the present invention, I inclose the compressing worm A of the machine or apparatus, for a suitable portion of its length from its forward or delivery end, by means of a tube or hollow cylinder B which is preferably rotatable, and is, according to one mode, built up of a number of plates or staves $b$ placed side by side as shown more clearly at Figs. 4, 5 and 7, the tube or cylinder so formed being fitted in a suitable frame, or held together by any suitable means, the means shown in the accompanying drawings consisting of two rings $b^1$ and $b^2$ (see Fig. 1), the whole being mounted in a casing or inclosing portion C secured to or forming part of the front or delivery end of the machine or apparatus, assuming the compressing worm A to be mounted in a horizontal or in an inclined position, the rings $b^1$, $b^2$ binding the plates or staves $b$ together in the tubular form in which they are arranged, and further, taking the wear resulting from the rotation of the tube if such tube is adapted to rotate, the ring $b^2$ being shown provided with teeth to constitute the worm wheel hereinafter more particularly referred to.

The portion C of the machine in which the tube B is mounted, is preferably provided with renewable bearings for such tube, in the form of brass or other suitable rings $c$, $c^1$.

Figure 6:
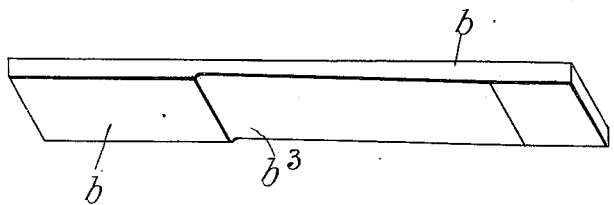

Some or all of the plates or staves from which the tube B is constructed are, according to one mode, recessed on one side for a suitable distance lengthwise as indicated at $b^3$ in Figs. 6 and 7, but they may be recessed on both sides if desired, the recesses being preferably tapered, the recesses shown at Figs. 6 and 7 being such that their deepest ends are toward the back end of the tube, the opposite ends of such recesses preferably running off flush with the face of the plates or staves, the said recesses when the plates or staves are placed together to form the tube, forming narrow tapered longitudinal passages $b^4$ which extend the desired distance along the tube and form outlets through the wall of the tube through which the oil or liquid expressed from the seed or other material being compressed within the tube escapes from such tube.

I fit up to the outlet end of the before mentioned tube B, a hollow plate or cap D provided with a number of die-holes or passages formed by preference by means of small tubes $d$ fitted in such hollow plate or cap, the inside of such tubes being preferably tapered from the back toward the front for a suitable part of the length of the tubes and then continued to the front in the form of straight holes, each tube being provided with a number of perforations or fine slits or passages through which the oil or liquid which is expressed from the material being compressed while such material is passing through the tubes, can escape and pass into the hollow interior of the plate or cap D and thence out through a passage $d^1$, or more than one provided for the purpose, and into the collecting tank hereinafter referred to.

For the purpose of assisting the expression by the compressing worm screw of the oil or liquid from the material being operated on, I draw the oil or liquid, as it is expressed, from the tube B which incloses a portion of the compressing worm and from the tubes $d$ in the hollow die-plate or cap D, by the creation of a vacuum, to allow of which I so form the base or other suitable part of the machine or apparatus that it constitutes an airtight tank or vessel E, the inlet $e$ (or inlets) to which is from the casing C in which the tube B is fitted and from the die-plate or cap D and I connect to this tank or vessel a pump F for exhausting the air therefrom and so creating a vacuum therein, the vacuum so created in conjunction with the pressure exerted by the compressing worm on the seed or other material under treatment insuring the most satisfactory expression of oil or liquid from the seed or the like.

A suitable pump G for pumping the oil or liquid expressed out of the seed or the like and which flows into the tank or vessel E, out of such tank or vessel, is fitted to such tank or vessel, $g$ indicating the suction pipe of such pump.

The compressing worm A, the tube B, if such tube is rotatable, and the pumps F and G are driven by any suitable means but preferably from a source of drive common to them all, one and a convenient arrangement for the purpose which I describe and illustrate by way of example only, consisting of a shaft H journaled in bearings J, $J^1$ on the top of the tank or vessel E, said shaft being provided with a fast pulley K driven from a line of shafting or other suitable source of power, a loose pulley $K^1$, a pinion or like wheel $K^2$ and a sprocket or other suitable wheel $K^3$, the pinion or like wheel $K^2$ gearing with a spur or like wheel L keyed or otherwise fixedly mounted on the compressing worm shaft $L^1$, or on a shaft $L^2$ to which the worm shaft is coupled or otherwise suitably connected, the latter being the arrangement illustrated, the sprocket or like wheel $K^3$ driving a shaft or spindle M by means of a chain $m$ or suitable gearing, said shaft or spindle M being provided with a bevel or like wheel $M^1$ which gears with a corresponding wheel N on a transverse shaft $N^1$ provided with a worm $n$ which gears with the worm wheel $b^2$ on the tube B which incloses a portion of the compressing worm A, and causes the rotation of such tube which has the effect of keeping the material passing therethrough moving in an annular direction in addition to its traveling along the compressing worm, these two distinct movements insuring a steady and regular movement of the material under compression to and through the outlets in the die-plate or cap D, through which outlets the material is extruded in the form of highly compressed residuum of the seed or the like from which the oil or liquid has been expressed, the cross-sectional shape of the extruded material corresponding with the shape of the outlets in the die-plate or cap D.

The pumps F and G are driven by means of chains O, or by belts or suitable gearing, from the shaft or spindle M driven from the pulley shaft H.

The tank or vessel E which receives the oil or liquid expressed from the seed or other material under treatment, is preferably divided into two or more compartments by means of a vertical wall or walls, such wall or walls being of a less height than that of the interior of the tank or vessel, the accompanying drawings (Fig. 1) showing the tank or vessel divided into three compartments by means of two walls $e^1$, $e^2$, the wall $e^2$ being lower than the wall $e^1$, the oil or liquid having to flow over the wall $e^1$ to pass from the first to the second compartment and over the wall $e^2$ to pass from the second compartment to the third one with the result that it becomes clearer in each compartment into which it passes from the fact that particles of solid matter settle in each compartment from which the oil or liquid flows. The said tank or vessel is provided with an opening P, or more than one, covered, or each covered by an air and liquid-tight plate $p$, or provided with an air and liquid-tight door, to allow of access being had to the interior. When the tank or vessel is divided into compartments, each compartment is preferably provided with an opening covered by an air and liquid-tight plate or door.

The machine or apparatus is provided with a kettle, hopper or the like (not shown as the same is common to this type of apparatus) which is mounted on the top of the tube-like portion R through which the seed or other material to be treated is fed to the compressing worm.

A knife S, or more than one, is or are preferably mounted on the outer end of the compressing worm shaft in such a manner as to rotate around the face of the die-plate or cap D and cut the compressed material into pieces of a suitable length as it is extruded through the holes in the die-plate or cap.

With my improvements it is possible to not only effectively express oil from oil-containing seeds, nuts and the like but also produce compressed blocks or "nuggets" as I will call them, for use as food for cattle and other animals, direct from such seeds or the like as a continuation or part of the process of expressing the oil from the seeds or the like.

Having thus described my invention what I claim and desire to secure by Letters Patent is:

1. In a press, a tubular press chamber provided with a series of longitudinally extending slits which are tapered from end to end, and means for compressing the material in the chamber so as to force its fluid portions through the said slits.

2. In a press, a tubular press chamber formed of a series of plates arranged face to face and having recesses which form a series of longitudinally extending slits around the chamber, said slits being tapered from end to end, and means for compressing the material in the chamber.

3. In a press, a tubular press chamber provided with a series of longitudinally extending slits which are tapered from end to end and which have their wider parts arranged at the receiving end portion of the chamber, and means for compressing the material in the chamber.

4. In a press, a tubular press chamber provided with a series of longitudinally extending slits which are tapered from end to end, driving mechanism for revolving the said press chamber, and means for compressing the material in the chamber while the chamber is being revolved.

5. In a press, a tubular press chamber provided with a series of longitudinally extending slits which are tapered from end to end, means for compressing the material in the press chamber, and means for diminishing the atmospheric pressure around the said chamber to accelerate the flow of fluid through the said slits.

6. In a press, a tubular press chamber provided with a series of longitudinally extending slits which are tapered from end to end, means for compressing the material in the press chamber so as to force its fluid portions through the said slits, and a series of tapering perforated tubes arranged at the delivery end of the said chamber and operating to form the solid material into separate portions.

7. In a press, a hollow casing, a tubular press chamber mounted in the casing and provided with a series of longitudinally extending slits which are tapered from end to end, a hollow head secured at the delivery end of the press chamber and provided with a series of tapering perforated tubes which operate to form the solid material into separate portions, means for compressing the material in the press chamber to force its fluid portions through the slits and perforations, and means for diminishing the atmospheric pressure in the casing and head to accelerate the flow of fluid.

In testimony whereof I affix my signature in the presence of two witnesses.

ALBERT WILLIAM SIZER.

Witnesses:
R. H. BRADFIELD,
LOUIS E. KIPPAX.